United States Patent
Ben-Rhouma et al.

(10) Patent No.: US 6,234,528 B1
(45) Date of Patent: May 22, 2001

(54) IMPACT ENERGY ABSORPTION MODULATING MEANS

(75) Inventors: Abdel Karim Ben-Rhouma; Benoît Duval; Laurent Gallou, all of Vendome (FR)

(73) Assignee: Nacam France SA, Vendome (FR)

( * ) Notice: Subject to any disclaimer, the term of this patent is extended or adjusted under 35 U.S.C. 154(b) by 0 days.

(21) Appl. No.: 09/467,784

(22) Filed: Dec. 20, 1999

(30) Foreign Application Priority Data

Jan. 6, 1999 (FR) .................................................. 99-00169

(51) Int. Cl.[7] ...................................................... B62D 1/99
(52) U.S. Cl. ............................................. 280/777; 74/492
(58) Field of Search .............................. 230/777; 74/492, 74/493

(56) References Cited

U.S. PATENT DOCUMENTS

| | | | |
|---|---|---|---|
| 5,320,384 | * 6/1994 | Arnold et al. | 280/777 |
| 5,605,352 | * 2/1997 | Riefe et al. | 280/777 |
| 5,690,362 | * 11/1997 | Peitsmeier et al. | 280/775 |
| 5,720,496 | * 2/1998 | Riefe et al. | 280/775 |
| 5,755,461 | * 5/1998 | Halacka et al. | 280/777 |
| 5,788,278 | * 8/1998 | Thomas et al. | 280/777 |
| 5,803,496 | * 9/1998 | Cymbal | 280/777 |
| 5,961,146 | * 10/1999 | Matsumoto et al. | 280/777 |
| 5,984,355 | * 11/1999 | Meidanis et al. | 280/777 |
| 6,116,648 | * 9/2000 | Holly et al. | 280/777 |

FOREIGN PATENT DOCUMENTS 19510615    9/1996  (DE) .

OTHER PUBLICATIONS

"Computer Controlled Energy Absorbing Steering Column for Automotive Use," Research Disclosure No. 359, Mar. 1, 1994, pp. 157–159, XP000440547, Industrial Opportunities Ltd., Havant GB ISSN: 0374–4353.

* cited by examiner

Primary Examiner—Eric Culbreth
Assistant Examiner—L. Lum
(74) Attorney, Agent, or Firm—Lawrence E Laubscher, Sr.

(57) ABSTRACT

A system for modulatable absorption of energy from an automobile vehicle steering column comprises a steering shaft mounted in a body-tube connected to a support assembly fixed to the chassis of the vehicle. The system for modulatable absorption of energy comprises a required number of windings with a particular section which are connected to a retaining pin device and to an anchor pin device. The anchor pin device comprises a holding rod which is moved along its axis by an electric actuator to select the number of windings concerned in the event of an impact.

19 Claims, 8 Drawing Sheets

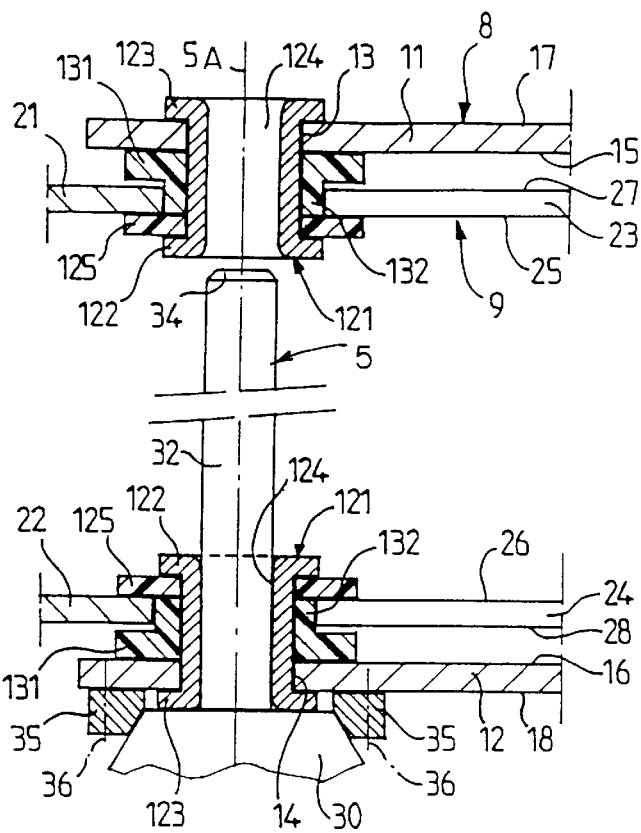
FIG.11
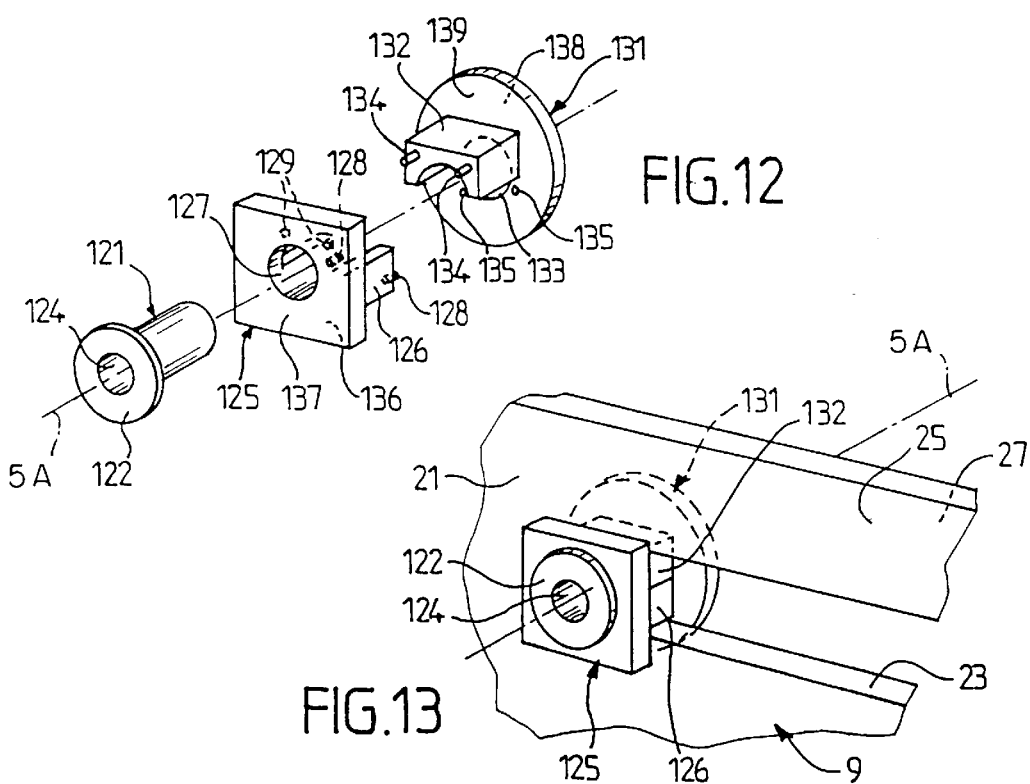
FIG.12
FIG.13

IMPACT ENERGY ABSORPTION MODULATING MEANS

BACKGROUND OF THE INVENTION

1. Field of the Invention

The present invention relates to a system for modulatable absorption of energy from an automobile vehicle steering column.

2. Description of The Prior Art

The system in accordance with the invention applies in particular to a steering column adjustable in the depthwise direction or in inclination or to a steering column adjustable in the depthwise direction and in inclination and whose steering shaft is mounted in a body-tube which is supported on and locked to the bodyshell in the required position. The steering column comprises a steering shaft rotatably mounted in a body-tube which is connected to a support assembly fixed to the chassis of the vehicle or to part of the bodyshell. The invention can equally be applied to a steering column that is not adjustable, in which case the body-tube is mounted directly in the support assembly.

Making steering columns safer requires manufacturers to control all parameters of energy absorbing systems. Accordingly, with regard to the method of absorbing energy by unwinding a wire, which is increasingly used for steering columns, consideration has been given to modulating the absorption of energy.

Until now, energy absorbing systems on steering columns are static and do not take account of the conditions under which the impact occurs. Once installed on the steering column, these systems have fixed characteristics and react to an impact in accordance with physical laws that do not change. Given that the amount of energy to be absorbed by a steering column in an accident varies according to various parameters, including the speed of the vehicle, the weight of the driver and whether or not the driver is wearing their seat-belt, and given the limitations of existing systems, it is necessary to consider the use of more intelligent systems, to increase their performance and to adapt their behavior to the conditions of the impact

OBJECT OF THE INVENTION

The object of the present invention is to propose a system for modulatable absorption of energy which uses wires of simple shape that are easy to make but which absorb exactly the required amount of energy to be dissipated, which system mounts easily within the overall dimensions of existing steering columns. Another aim of the invention is to produce an electromechanical system capable of controlling the absorption of energy from a steering column during an accident in accordance with various parameters, in particular the weight of the driver, whether or not the driver is wearing their seat-belt and the speed of the vehicle at the time of the impact.

SUMMARY OF THE INVENTION

According to a first embodiment, the invention concerns a system for modulatable absorption of energy from an automobile vehicle steering column which comprises a steering shaft rotatably mounted in a body-tube connected to a support assembly which is fixed to the chassis of the vehicle. The system for modulatable absorption of energy operates in a direction substantially parallel to a steering axis of the steering column.

A fixed support member is fastened to the chassis of the vehicle and a mobile support member is connected to the fixed support member to constitute the support assembly. The mobile support member is connected to and locked on the fixed support member against forces up to a particular value whereby the locking is overcome in the event of an impact.

The system for modulatable absorption of energy includes:
 the support assembly,
 at least one retaining pin means,
 at least one anchor pin means,
 a plurality of energy absorbing windings, and
 at least one holding rod constituting either the retaining pin means or the anchor pin means.

Each retaining pin means is substantially perpendicular to the steering axis of the steering column and is disposed in the fixed support member.

Each anchor pin means is substantially perpendicular to the steering axis of the steering column and is disposed in the mobile support member.

The windings are obtained from a metal member of particular section which is round or square, the windings being connected to the corresponding retaining and anchor pin means.

The windings are mounted on one or more rollers on a corresponding retaining pin means fastened to the fixed support member.

Each of the windings has a free end which is anchored to a corresponding anchor pin means at the end of the mobile support member on the same side as a steering box, i.e., on the opposite side to a steering wheel.

Each corresponding anchor pin means for the windings or each corresponding retaining pin means for the windings comprises a holding rod movable along its axis by displacement means which are activated by control means.

This arrangement allows to connect the anchor pin means and the retaining pin means by a required number of windings, which can be determined according to the weight of the driver. Therefore, in the event of an impact, the mobile support member, which is connected to the body-tube and therefore to the steering wheel, pulls on the free ends of the windings attached to the anchor pin means to unwind the winding(s) concerned and absorb the energy it is required to dissipate.

Advantageously, according to the invention, the displacement means for each holding rod comprise an electric actuator which is activated by electric control means on a dashboard of the vehicle.

The electric actuator can be a gear motor or an electromagnetic actuator with a movable core.

In a first type of structure in accordance with the invention, a holding rod constitutes the anchor pin means of the corresponding windings. An electric actuator drives the holding rod which is at the end of the mobile support member. The retaining pin means is on the fixed support member.

The fixed support member includes a base with two substantially vertical lugs between which the mobile support member engages, each of the lugs having a hole in it through which the retaining pin passes.

The mobile support member has two lateral portions and one connection portion.

Each of the lateral portions has an oblong hole at the top through which the retaining pin passes and whose length corresponds to an energy recovery travel.

Three windings are mounted on a roller which is disposed around the retaining pin means. Each winding has a rectilinear portion extending in substantially the same direction as a force to be damped and each rectilinear portion extends by a free end curved around the holding rod.

In this first type of structure, the retaining pin means comprises a rod with a sleeve between the two lateral portions of the mobile support member. Said rod is held at each end by a fixing assembly on the corresponding lug of the fixable member and by a sliding assembly of the mobile support member. Each fixing assembly is locked on each of the lugs against forces up to a particular value.

Each fixing assembly comprises a clamping washer between the sleeve and the corresponding lug of the fixed support member and which has a tube passing through the oblong hole in the corresponding lateral portion of the mobile support member.

A corresponding screwthreaded end of the rod passes through the tube of the clamping washer and the hole in the corresponding lug to receive a clamping nut which is pressed onto the lug to lock the fixing assembly against forces up to a particular value.

Each sliding assembly includes an outer washer with a square protuberance and an inner washer with a square hole which receives the square protuberance.

The square protuberance has a hole through which the tube of the clamping washer passes.

The outer washer is between the corresponding lug of the fixed support member and the corresponding lateral portion of the mobile support member.

The inner washer is between the lateral portion and the clamping washer. Furthermore, the square protuberance passes through and slides in the corresponding oblong hole of the mobile support member.

In a variant of embodiment, the rod has one screwthreaded end and at the other end a head pressed onto the corresponding lug of the fixed support member.

In the first type of structure, the anchor pin means comprises the holding rod and its electric actuator mounted on and fixed to the outer bearing face of the mobile support member.

The holding rod passes through a hole in each lateral portion of the mobile support member. Furthermore, the holding rod is supported by two bearings forming part of a stirrup mounted on and fixed to the connecting portion of the end of the mobile support member.

A closure member of the stirrup surrounds the end of the mobile support member, the stirrup and the free ends of the windings. This closure member is assembled to the mobile support member and the stirrup.

In a second type of structure in accordance with the invention, a holding rod constitutes the retaining pin means of the corresponding windings. An electric actuator drives the holding rod which is in the fixed support member. The anchor pin means is at the end of the mobile support member.

The fixed support member includes two substantially vertical lugs between which the mobile support member engages, each of the lugs having a hole in it through which the retaining pin means passes.

The mobile support member has two lateral portions and a connecting portion. Each of the lateral portions has an oblong hole at the top through which the retaining pin means passes and whose length corresponds to an energy recovery travel.

Three windings each mounted on a roller around the holding rod. Each winding has a rectilinear portion extending in substantially the same direction as a force to be damped, and each rectilinear portion has a free end curved around the anchor pin means. The three rollers are mounted on a tube in which the holding rod slides.

In this second type of structure, the retaining pin means comprises the holding rod and its electric actuator mounted on and fixed to the outside face of the corresponding lug of the fixed support member.

The retaining pin means has at each end a fixing assembly on the corresponding lug of the fixed support member and a sliding assembly for the corresponding lateral portion of the mobile support member. Each fixing assembly is locked on each of the lugs against forces up to a particular value. The holding rod passes through or engages in the corresponding fixing assembly.

Each fixing assembly comprises a metal tube which passes through the oblong hole of the corresponding lateral portion of the mobile support member and through the hole in the corresponding lug.

An inner flare lays out on the tube on the same side as the lateral portion and an outer flare on the same side as the lug for locking the fixing assembly. A hole through which the holding rod passes is formed in the tube.

Each sliding assembly includes an outer washer and an inner washer.

The outer washer has a square half-protuberance and a hole through it.

The inner washer has a square half-protuberance and a hole through it.

Each half-protuberance nest in the other washer by means of tenons entering holes to form a square protuberance.

The outer washer is between the corresponding lug of the fixed support member and the corresponding lateral portion of the mobile support member. The inner washer is between the lateral portion and the inner flare of the metal tube. The square protuberance passes through and slides in the corresponding oblong hole in the lateral portion of the mobile support member moreover, the holding rod is supported by four bearings forming part of a stirrup mounted under and fixed to the fixed support member.

In the second type of structure, the anchor pin means comprises three semi-circular notches in an edge of the connecting portion which is part of the end of the mobile support member. Each notch receives the free end of the corresponding winding and the free end curves around the corresponding notch.

The system in accordance with the invention for modulatable absorption of energy therefore has the advantage of having a structure that is simple to produce with guaranteed build quality when mass produced, as is the case in the automobile industry. Moreover, the system fits easily within the overall dimensions of existing steering columns. Finally, the system for modulatable absorption of energy matches the absorption of energy exactly to what is required, allowing in particular for the weight of the driver, whilst retaining the same unwinding travel.

BRIEF DESCRIPTION OF THE DRAWINGS

Further features and advantages of the invention will be apparent from the following particular description of several preferred embodiments of the invention as illustrated in the corresponding accompanying drawings in which:

FIG. 11 is partial sectional view to a larger scale of the retaining pin means from FIG. 9;

FIG. 12 is an exploded perspective view corresponding to FIG. 11;

FIG. 13 is a perspective view corresponding to FIG. 11; and

DESCRIPTION OF THE PREFERRED EMBODIMENTS

Figure 1:
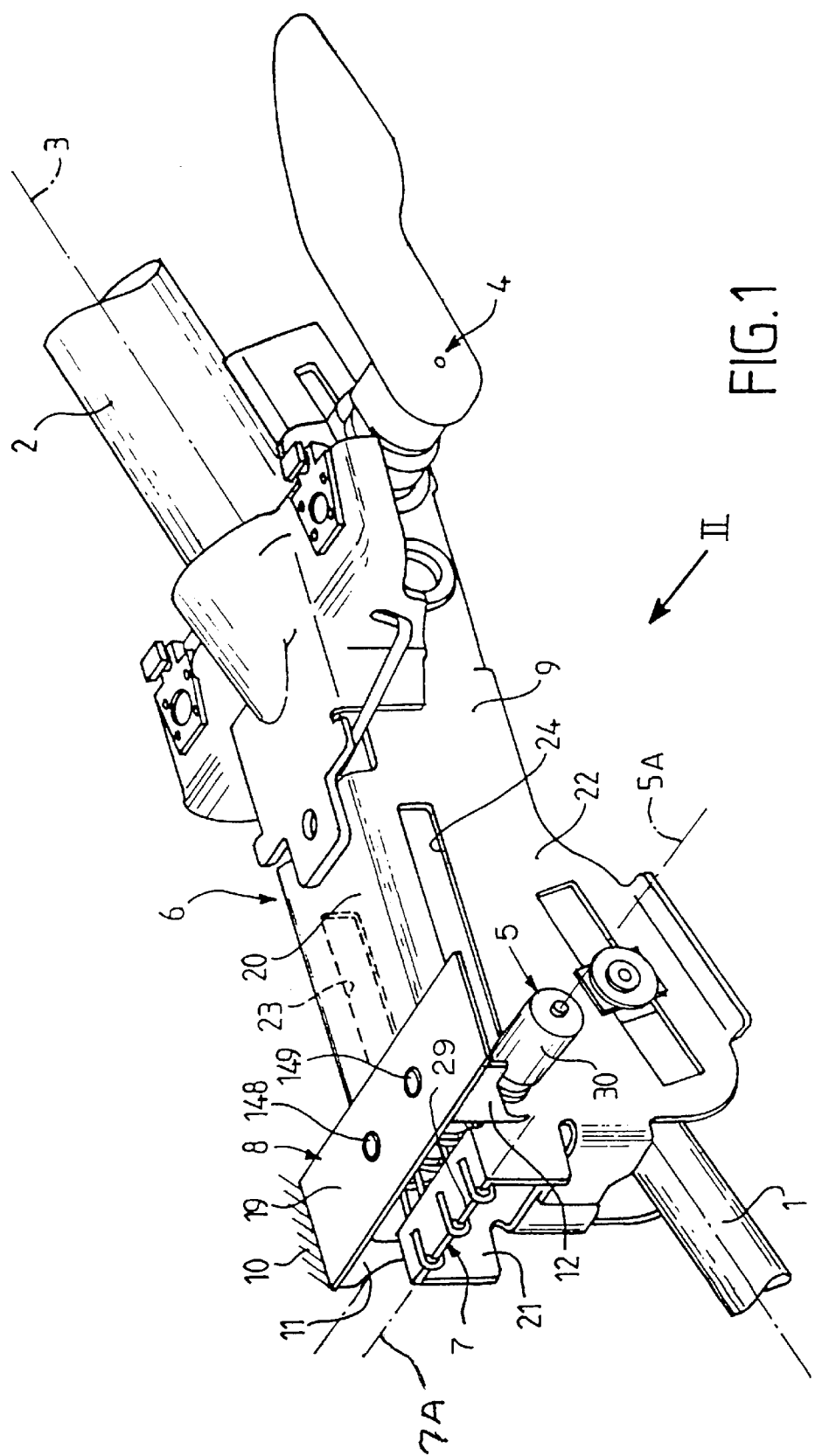
FIG. 1 is a top perspective view of an automobile vehicle steering column which is equipped with a system in accordance with the invention for variable absorption of energy.
Figure 2:
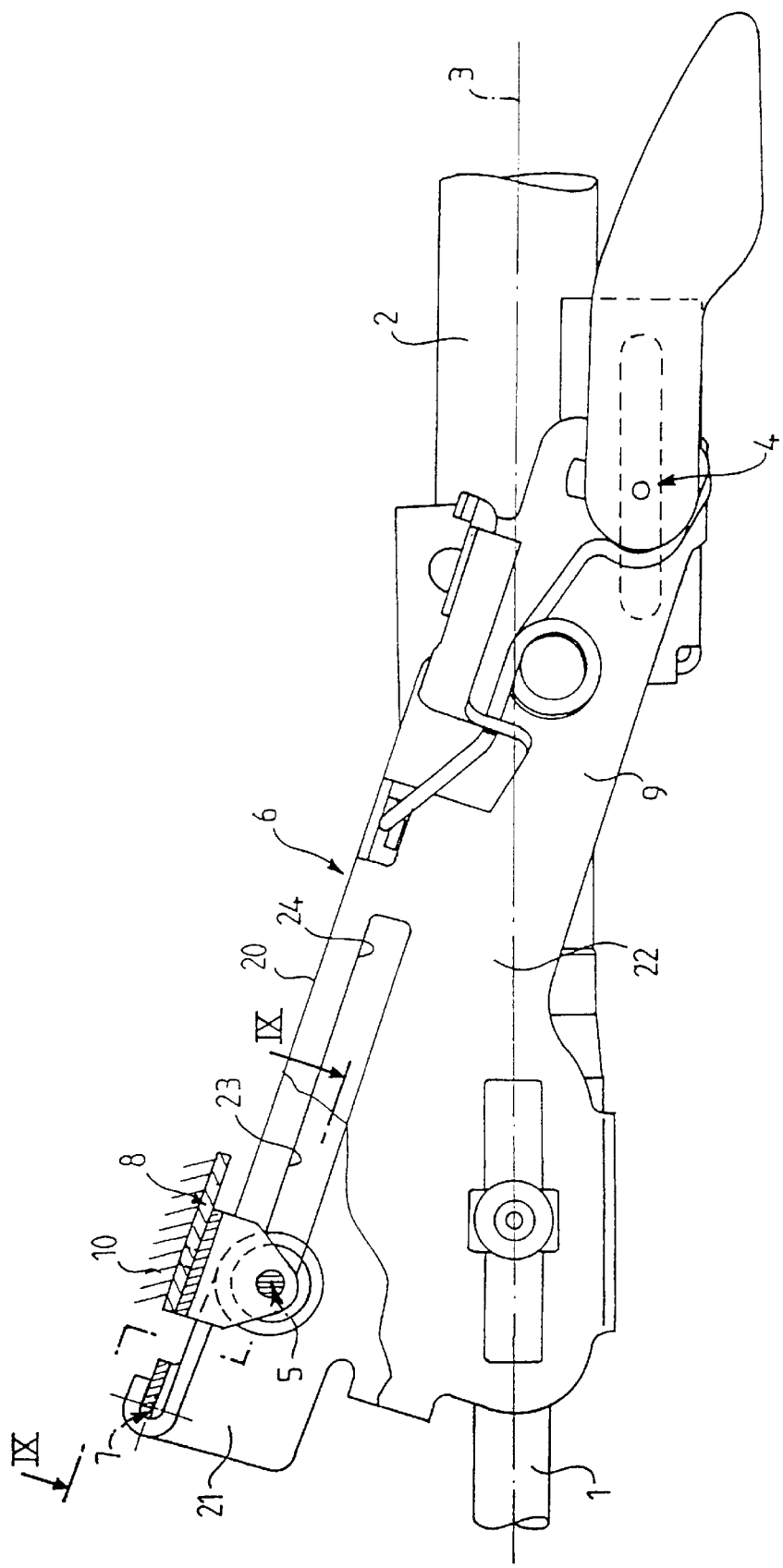
FIG. 2 is a side elevation view in the direction of the arrow II in FIG. 1.

As shown in FIGS. 1, 2, 3 and 9, the automobile vehicle steering column comprises a steering shaft 1 which is mounted in a body-tube 2 to rotate about a steering axis 3 shown in FIGS. 1 and 2. The body-tube 2 is connected to a support assembly 6 by a position adjustment system 4 for adjusting its position both in the depthwise direction or in inclination or by a system 4 for adjusting its position in the depthwise direction and in inclination. The invention can equally be applied to a steering column which cannot be adjusted, in which case the body-tube 2 is connected directly to the support assembly 6.

The support assembly 6 comprises a fixed support member 8 and a mobile support member 9. The fixed support member 8 is fastened to the chassis 10 of the vehicle or to part of the bodyshell. The mobile support member 9 is connected to the body-tube 2 by the position adjustment system 4. The mobile support member 9 is connected to the fixed support member 8 and said mobile support member 9 is locked on said fixed support member with a force having a predetermined value which allows for the impact to be absorbed, to enable the mobile support member 9 to slide in the fixed support member 8 in the event of the impact.

The fixed support member 8 includes a base 19 with two substantially vertical lugs 11 and 12 mounted on the base 19. The lugs 11 and 12 include respective holes 13 and 14 (FIG. 3) through which the retaining pin means 5 of the mobile support member 9 passes. The lugs 11 and 12 are substantially parallel to the steering axis 3.

The mobile support member 9 is generally U-shaped and includes two substantially vertical lateral side portions 21 and 22 and a substantially horizontal connecting transverse portion 20. The two lateral portions 21 and 22 of the mobile support member 9, which are substantially parallel to the steering axis 3, engage between the two lugs 11 and 12 of the fixed support member 8.

The lateral side portions 21 and 22 have respective oblong holes 23 and 24 at the top through which the retaining pin means 5 of the mobile support member 9 passes. The length of each of the oblong holes 23 and 24 corresponds to the energy recovery travel. Each of the lateral portions 21 and 22 has a hole at the bottom through which the axis of the adjustment systems 4 passes. The system in accordance with the invention for modulatable absorption of energy is operative in a direction substantially parallel to the axis of the steering column. In the remainder of the description, and for the same member, the expression "inside" used in relation to the steering axis 3 means nearer the steering axis 3 and "outside" means farther away from it. Thus, in relation to the steering axis 3, the lug 11 of the fixed support member 8 has an inside face 15 and an outside face 17. Similarly, in relation to the steering axis 3, the lug 12 has an inside face 16 and an outside face 18.

In the same fashion, for the mobile support member 9, the lateral portion 21 has an inside face 25 and an outside face 27 and the lateral portion 22 has an inside face 26 and an outside face 27.

As shown in FIGS. 1, 2, 3 and 9, the system in accordance with the invention for modulatable absorption of energy includes:

at least one retaining pin means 5 having an axis 5A;

at least one anchor pin means 7 having an axis 7A, and a plurality of windings which are connected to the retaining and anchor pin means 5, 7.

Figure 3:
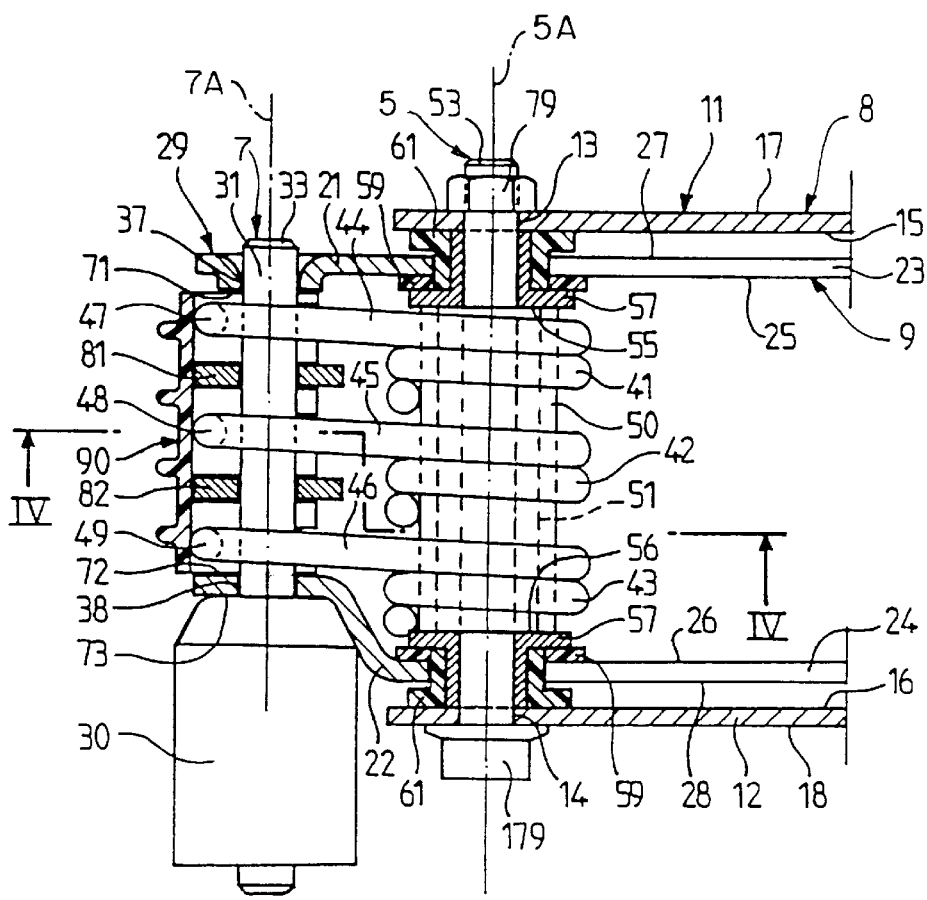
FIG. 3 is a cross-section in the plane containing the retaining and anchor pin means.
Figure 4:
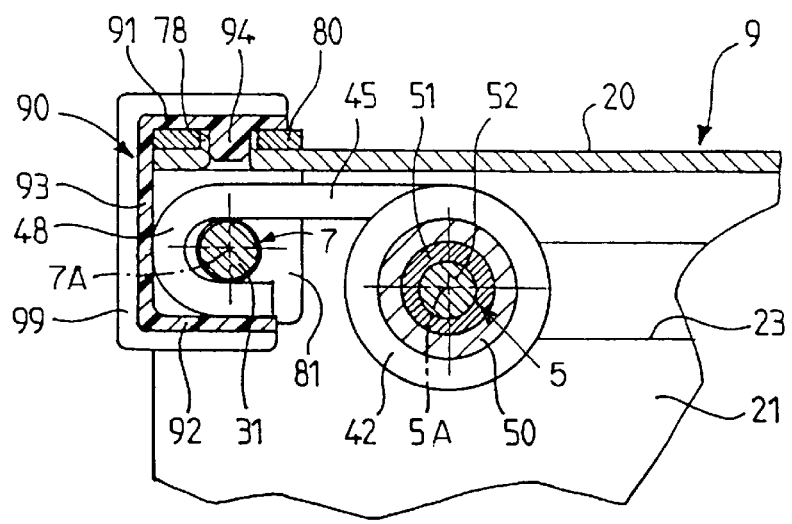
FIG. 4 is a cross-section taken along the line IV—IV in FIG. 3.
Figure 9:
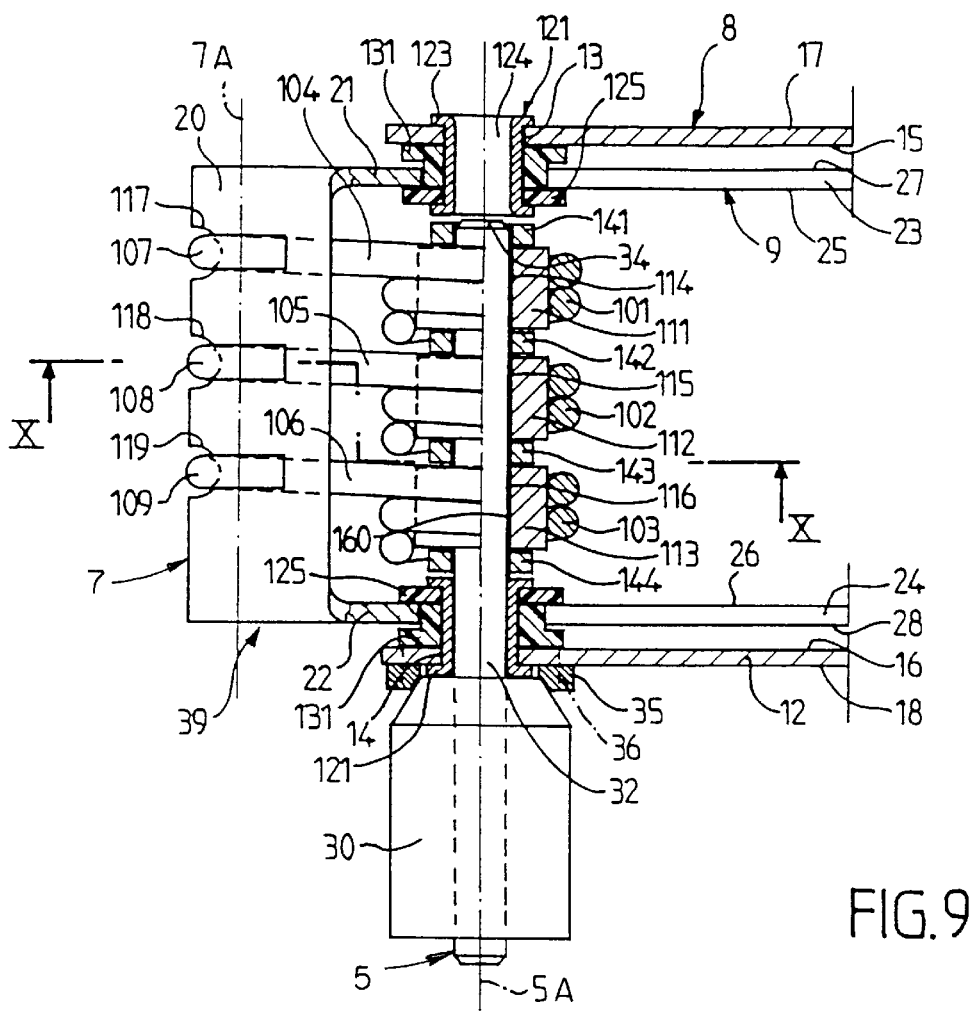
FIG. 9 is a section taken along the line IX—IX in FIG. 2 of a different embodiment of the invention.
Figure 10:
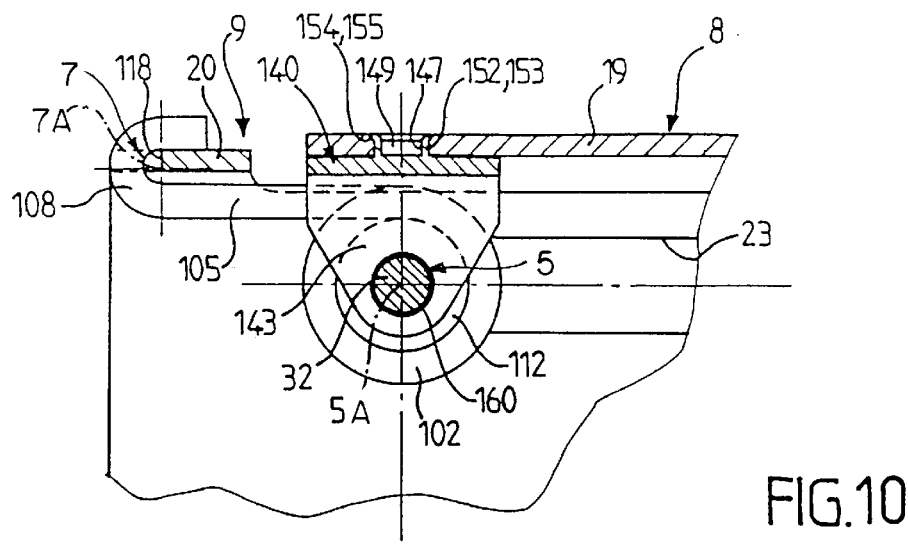
FIG. 10 is a section taken along the line X—X in FIG. 9.

The retaining pin means 5 is substantially perpendicular to the steering axis 3 of the steering column in the fixed support member 8. The anchor pin means 7 is substantially perpendicular to the steering axis 3 of the steering column in the mobile support member 9. The windings are made from a metal member with a particular cross-section, for example a round or square section. In FIG. 3, the windings 41, 42 and 43 are mounted on a roller 50 on the corresponding retaining pin means 5 fastened to the fixed support member 8. In FIG. 9, the windings 101, 102 and 103 are mounted on respective rollers 111, 112 and 113 on the corresponding retaining pin means 5 fastened to the fixed support member.

The windings 41, 42, 43 have respective free ends 47, 48 and 49 which are attached to the corresponding anchor pin means 7 at one end 29 of the mobile support member 9. The windings 101, 102 and 103 have respective free ends 107, 108 and 109 which are attached to the corresponding anchor pin means 7 at the end 39 of the mobile support member 9. The corresponding end 29 or 39 of the mobile support member 9 is on the same side as the steering box, i.e., on the side opposite the steering wheel.

In accordance with one essential feature of the invention, each anchor pin means 7 of the windings in FIG. 3 or each retaining pin means 5 of the windings in FIG. 9 consists of a respective holding rod 31, 32. The holding rod 31 and the holding rod 32 are mobile along their axis. Their movement is imparted by displacement means actuated by actuator means 30. In this way, it is possible, in accordance with the invention, to connect the anchor pin means 7 to the retaining pin means 5 by a number of windings determined according to characteristics of the driver and in particular the weight of the driver. Accordingly, in the event of a collision, the support member 9, which is connected to the body-tube 2 and therefore to the steering wheel, pulls on the free ends of the windings, which are anchored to the anchor pin means 7, to unwind the winding and absorb the energy it is required to dissipate.

The displacement means for the holding rod 31 or 32 comprise an electric actuator 30 activated by electric control means on the dashboard of the vehicle. In one variant of the invention the electric actuator 30 is a gear motor and in another variant of the invention the electric actuator 30 is an electromagnetic device with a movable plunger.

FIGS. 3, 4, 5, 6, 7 and 8 show a first embodiment of the invention. In this first type of structure in accordance with the invention, the holding rod 31 and its end 33 constitute the anchor pin means 7 for the corresponding windings. The electric actuator 30 drives the holding rod 31 at the end 29 of the mobile support member 9. The retaining pin means 5 is on the fixed support member 8.

The fixed support member 8 has a base 19 with its two lugs 11 and 12 which have holes 13 and 14 in them through which the retaining pin means 5 passes. The mobile support member 9 includes the two lateral portions 21 and 22 and the connecting portion 20. Each of the lateral portions 21 and 22 has an oblong hole 23 and 24 at the top through which the retaining pin means 5 passes and whose length corresponds to the energy recovery travel.

Three windings 41, 42 and 43 are mounted on a single tubular roller 50 mounted on a sleeve 51 around the retaining pin means 5. Each winding 41, 42 and 43 has a respective rectilinear portion 44, 45 and 46 extending in substantially the same direction as the force to be damped. Each rectilinear portion 44, 45 and 46 has a respective free end 47, 48 and 49 curved around the holding rod 31.

The retaining pin means 5 comprises a rod 52 (FIG. 4) which passes through the fixed support member 8 and the mobile support member 9. The rod 52 carries the sleeve 51 between the respective inside faces 25 and 26 of the two lateral portions 21 and 22 of the mobile support member 9. The rod 52 is held at each end 53 and 54 by a fixing assembly which mounts on the corresponding lugs 11 and 12 of the fixed support member 8. The mobile support member 9 can slide in the fixing assembly. Each fixing assembly is locked on each of the lugs 11 and 12 with a force having a predetermined value.

Figure 5:
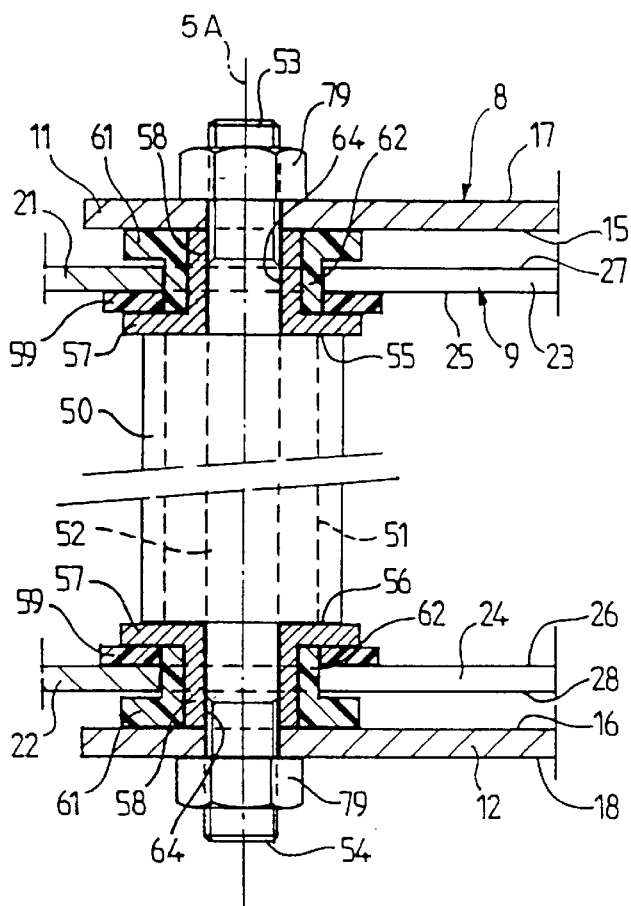
FIG. 5 is partial sectional view to a larger scale of the retaining pin means from FIG. 3.
Figure 6:
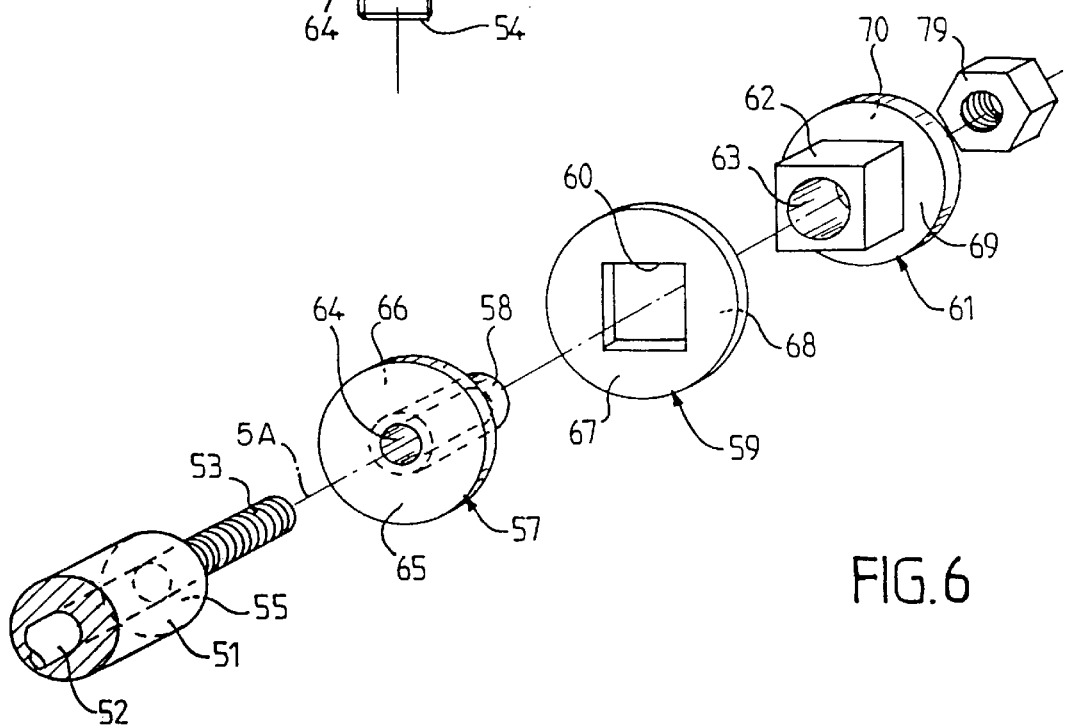
FIG. 6 is an exploded perspective view corresponding to FIG. 5.

As shown in more detail in FIGS. 5 and 6, each fixing assembly at the end of the rod 52 comprises a clamping washer 57. The clamping washer 57 is between the bearing face 55 or 56 of the sleeve 51, which is in contact with its inside face 65, and the corresponding inside face 15 or 16 of the lugs 11 and 12 of the fixed support member 8. The clamping washer 57 includes a tubular portion 58 which passes through the corresponding oblong holes 23 and 24 in the corresponding lateral portions 21 and 22 of the mobile support member 9. The rod 52 has screwthreaded end portions 53 and 54 which pass through a hole 64 in the tube 58 of the clamping washer 57. The screwthreaded end portions 53 and 54 pass through the holes 13 and 14 in the corresponding lugs 11 and 12 and receive a clamping nut 79 which is pressed onto the corresponding outside faces 17 and 18 of the lugs 11 and 12 to lock the fixing assembly against forces up to a particular value.

Each sliding assembly includes an outer washer 61 with an inside face 69 and an outside face 70 and an inner washer 59 with an inside face 67 and an outside face 68. The outer washer 61 has a square protuberance 62 and the inside washer 59 has a square hole 60 adapted to receive said square protuberance 62. Moreover, the square protuberance 62 has a hole 63 through which the tube 58 of the clamping washer 57 passes. The outer washer 61 is between the corresponding inside faces 16 and 18 of the corresponding lugs 11 and 12 of the support member 8 and the corresponding outside faces 27 and 28 of the corresponding lateral portions 21 and 22 of the mobile support member 9. The inner washer 59 is between the corresponding inside faces 25 and 26 of the lateral portions 21 and 22 and the outside face 66 of the clamping washer 57. The square protuberance 62 passes through and slides in the corresponding oblong holes 23 and 24 in the mobile support member 9.

In one embodiment of the invention, the rod 52 has one screwthreaded end 53 and its other end consists of a head 179 pressed onto the corresponding lug 12 of the fixed support member 8, as shown in FIG. 3.

The anchor pin means 7 consists of the holding rod 31 whose electric actuator 30 is mounted on and fixed to an outside bearing face 73 of the mobile bearing member 9. The holding rod 31 passes through holes 37 and 38 in the respective lateral portions 21 and 22 of the mobile support member 9 and is supported by two bearings 81 and 82 which are part of a stirrup 80. The stirrup 80 is mounted on and fixed to the transverse connecting portion 20 of the ends 29 of the mobile support member 9.

A closure member 90 (FIGS. 4 and 8) of the stirrup 80 surrounds the assembly formed by the end 29 of the mobile support member 9, the stirrup 80 and the free ends 47, 48 and 49 of the respective windings 41, 42 and 43. The closure member 90 is assembled to the mobile support member 9 and the stirrup 80.

Figure 7:
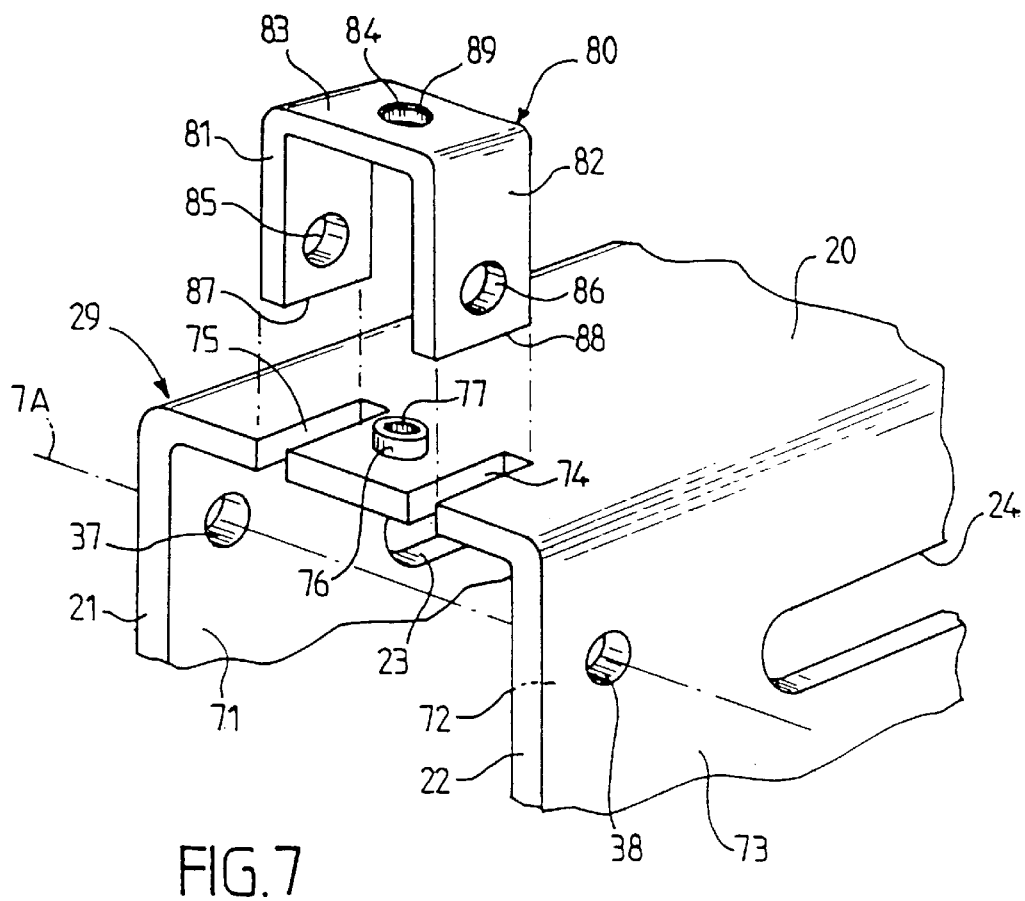
FIG. 7 is an exploded perspective view corresponding to FIG. 4.
Figure 8:
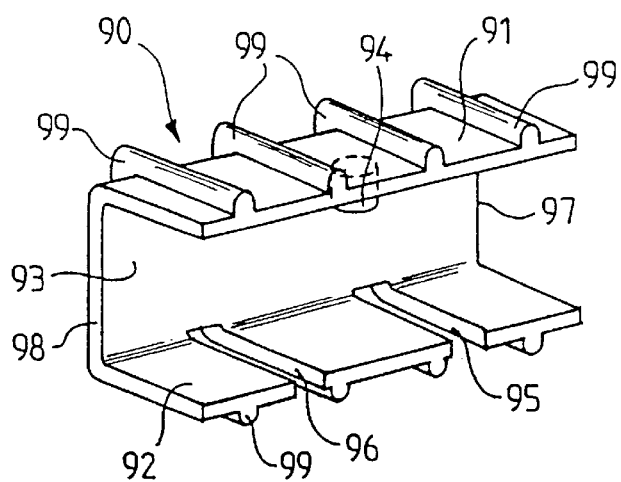
FIG. 8 is a perspective view of one of the components shown in FIG. 4.

The assembly of the stirrup 80 and the closure member 90 is shown in more detail in FIGS. 7 and 8. The end 29 of the mobile support member 9 has two open-ended notches 74 and 75 and a tenon 76 with a hole 77. The stirrup 80 has a base 83 with a respective bearing 81 and 82 at each end. The bearings 81 and 82 have holes 85 and 86 which support the holding rod 31 which passes through them. The base 83 has a flared hole 84 through which the tenon 76 passes. The bearings 81 and 82 engage in the open-ended notches 74 and 75 and the end of the tenon 76 is peened over the flare 89 of the hole 84 to obtain a flare 78.

The closure member 90 has two substantially parallel flanges 91 and 92 connected by a base 93 and stiffeners 99 on the outside of the two flanges 91 and 92 and the base 93. There are two open-ended notches 95 and 96 in the flange 92 and the base 93. The flange 91 has a tenon 94 which engages in the hole 77 in the tenon 76 and the ends 87 and 88 of the bearings 81 and 82 engage in the open-ended notches 95 and 96. The lateral faces 97 and 98 of the closure member 90 slide between the inside bearing faces 71 and 72 at the end 29 of the mobile support member 9.

FIGS. 9, 10, 11, 12, 13 and 14 show a second embodiment of the invention. In this second type of structure in accordance with the invention, the holding rod 32 and its end 34 constitute the retaining pin means 5 for the corresponding windings. An electric actuator 30 drives the holding rod 32, which is mounted in the fixed support member 8. The anchor pin means 7 is at the ends 39 of the mobile support member 9.

The fixed support member has holes 13 and 14 through which the retaining pin means 5 passes in each of the lugs 11 and 12 fastened to the base 19 of the fixed support member 8. The mobile support member 9 has lateral portions 21 and 22 and a connecting portion 20. Each of the lateral portions 21 and 22 has an oblong hole 25 and 26 at the top through which the retaining pin means 5 passes and whose length corresponds to the energy recovery travel. Three windings 101, 102 and 103 are mounted on respective rollers 111, 112 and 113 around the holding rod 32. Each winding 101, 102 and 103 has a respective rectilinear portion 104, 105 and 106 which extends in substantially the same direction as the force to be damped. Each rectilinear portion 104, 105 and 106 has a respective free end 107, 108 and 109 curved around the anchor pin means 7. The three rollers 111, 112 and 113 have respective holes 114, 115 and 116 and are mounted on a thin tube 160 inside which the holding rod 32 slides.

The retaining pin means 5 consists of the holding rod 32 whose electric actuator 30 is mounted on and fixed to the outside face 18 of the corresponding lug 12 of the fixed support member 8 by means of a fixing ring 35 and fasteners 36. The retaining pin means 5 has a fixing assembly at each end on the corresponding lugs 11 and 12 of the fixed support member 8. A sliding assembly for the corresponding lateral portions 21 and 22 of the support member 9 is provided in each fixing assembly. Each fixing assembly is locked to each of the lugs 11 and 12 against forces up to a particular value. The holding rod 32 passes through or engages in the corresponding fixing assembly.

As shown in more detail in FIGS. 11, 12, 13 and 14, each fixing assembly comprises a metal tube 121 which passes through the oblong holes 23 and 24 in the corresponding lateral portions 21 and 22 of the mobile support member 9. The metal tube 121 passes through the holes 13 and 14 in the corresponding lugs 11 and 12 of the fixed support member 8. The fixing assembly is immobilized by an inner flare 122 on the same side as the corresponding lateral portions 21 and 22 and an outer flare 123 on the same side as the corresponding lugs 11 and 12. The metal tube 121 has a passage 124 through which the holding rod 32 passes.

Each sliding assembly includes an outer washer 131 with an inside face 139 and an outside face 138 and an inner washer 125 with an inside face 137 and an outside face 136. The outer washer 131 has a square half-protuberance 132 and a hole 133 through it. The inner washer 125 similarly has a square half-protuberance 126 and a hole 127 through it. Each half-protuberance 126 and 132 nests in the respective other washer 131 and 125, the respective tenons 128 and 133 entering corresponding holes 129 and 135 to form a square protuberance.

The outer washer 131 is between the corresponding lugs 11 and 12 of the fixed support member 8 and the corresponding lateral portions 21 and 22 of the mobile support member 9. The inner washer 125 is between the corresponding lateral portions 21 and 22 and the inner flare 122 of the metal tube 121. The square protuberance passes through and slides in the corresponding oblong holes 23 and 24 in the lateral portions 21 and 22 of the mobile support member 9.

The holding rod 32 is supported by four bearings 141, 142, 143 and 144 which form part of a stirrup 140. The stirrup 140 is mounted under and fixed to the base 19 of the fixed support member 8.

Figure 14:
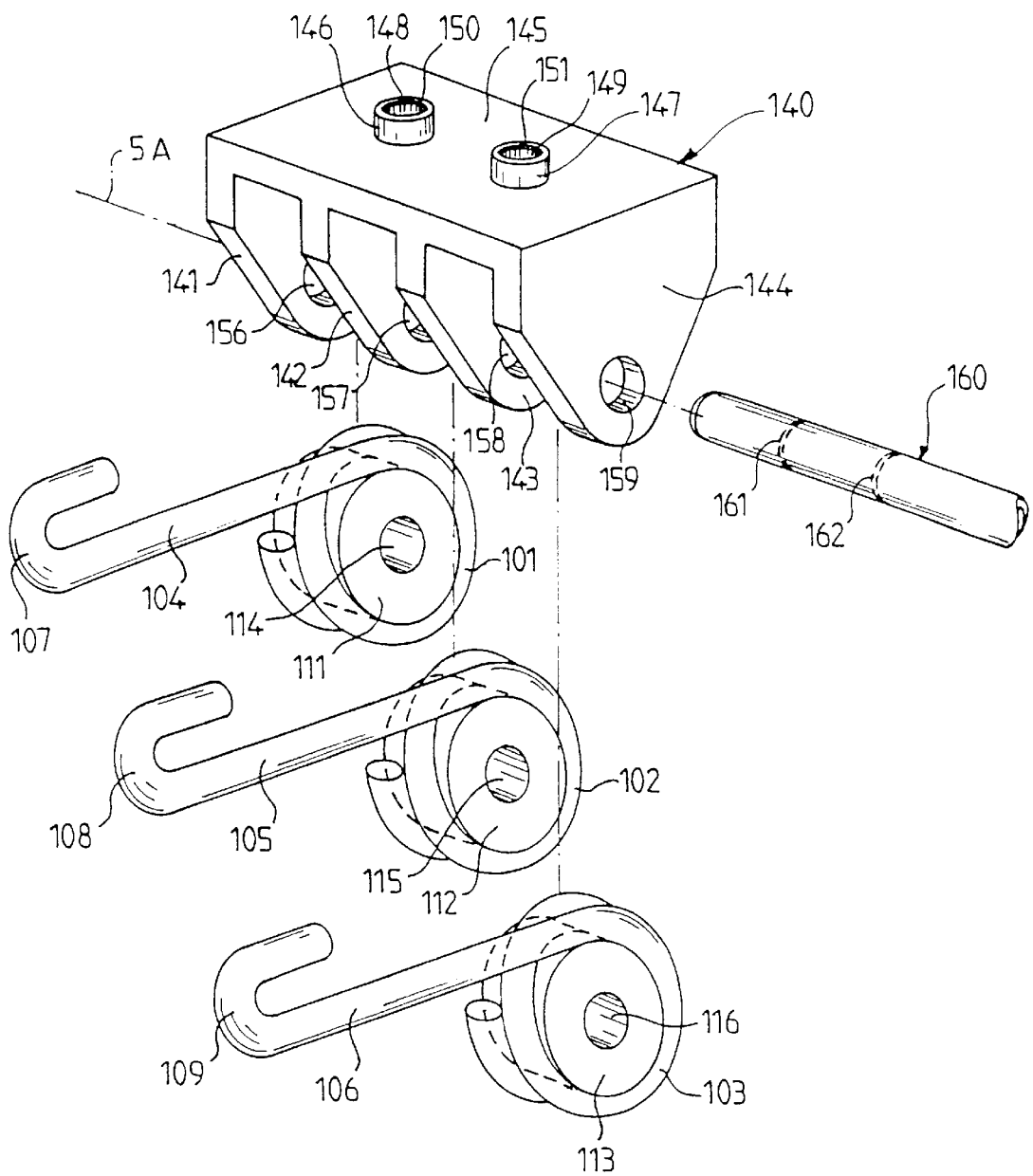
FIG. 14 is an exploded perspective view corresponding to FIGS. 9 and 10.

FIG. 14 shows the mounting of the stirrup 140 and the thin tube 160 on the fixed support member 8.

The base 19 of the fixed support member 8 has two flared holes 152 and 153 with flares 154 and 155.

The stirrup 140 has a base 145 with four bearings 141, 142, 143 and 144. Each of these bearings has a hole 156, 157, 158 and 159 for mounting the thin tube 160, which is pre-cut at 161 and 162. The base 145 has two tenons 146 and 147 with holes 148 and 149 and which engage in the two flared holes 152 and 153. The ends of the tenons 146 and 147 are peened over the flares 154 and 155 of the holes 152 and 153 to obtain the flares 150 and 151.

The anchor pin means 7 consists of three semicircular notches 117, 118 and 119 at the edge of the connecting portion 20 which is part of the end 39 of the mobile support member 9, the notches 117, 118 and 119 receiving the free ends 107, 108 and 109 of the corresponding windings 101, 102 and 103, each free end curving around the corresponding notch.

The system of the invention therefore proposes to use a succession of metallic windings fixed at one end to a rigid structure of the vehicle and at the other end to a part of the steering column which can slide during the impact. The movement of this part of the steering column unwinds the windings which absorb the energy of the driver impacting on the steering wheel. According to the invention, to optimize the amount of energy absorbed by the system, the system must be adapted according to the conditions that apply during the impact (in particular the weight of the driver, whether or not the driver is wearing their seat-belt and the speed of the vehicle) to maximize the safety of the driver.

Adapting the energy absorbed by the system to the conditions of the impact is achieved by selecting a particular number of windings. According to the invention, this is done in accordance with information supplied by sensors of various relevant parameters. These parameters vary in time and, to adapt to them, the electric actuator 30 must control at all times the linear movement of a rigid core, i.e., the corresponding mobile holding rod 31 or 32, which selects the number of windings corresponding to the state of those parameters.

What we claim is:

1. A system for modulating a absorption of energy from an automobile vehicle steering column upon an impact to the vehicle which comprises a steering shaft rotatably mounted in a body-tube connected to a support assembly which is fixed to the chassis of said vehicle, which modulating system operates in a direction substantially parallel to the steering axis of said steering column and comprises:
   (a) a fixed support member fastened to said chassis of said vehicle, and a mobile support member connected to said fixed support member to constitute said support assembly, said mobile support member being connected to and locked on said fixed support member by a force having a predetermined value, whereby said locking is overcome in the event of an impact;
   (b) at least one retaining pin means 5 arranged in said fixed support member substantially perpendicular to said steering axis of said steering column;
   (c) at least one anchor pin means (7) arranged in said mobile support member substantially perpendicular to said steering axis of said steering column; and
   (d) a plurality of resilient windings (41–53: 101–103) connected between said retaining pin means and said anchor pin means, wherein:
     (1) said windings comprise helical torsion windings mounted concentrically on at least one tubular roller rotatable mounted on the retaining pin means (5) fastened to said fixed support;
     (2) each of said windings having a free end which is anchored to the anchor pin means (7) arranged at the end of said mobile support member intermediate said retaining pin means and the steering wheel end of the steering shaft;
     (3) at least one of said retaining pin means and said anchor pin means being axially displaceable by control means (30);
     (4) said control means being operable to select a number of windings connected between said anchor pin means and said retaining pin means, whereby the number of windings unwound upon the occurrence of impact to the vehicle corresponds with the absorption energy that is to be dissipated.

2. The system for modulating the absorption of energy claimed in claim 1, wherein said holding rod comprises said anchor pin means.

3. The system for modulatable absorption of energy claimed in claim 2, wherein
   said displacement means for each holding rod comprise an electric actuator which is activated by electric control means on a dashboard of said vehicle, said fixed support member includes a base with two substantially vertical lugs between which said mobile support member engages, each of said lugs having a hole in it through which said retaining pin means passes, said mobile support member has two lateral portions and one connection portion, each of said lateral portions has an oblong hole at the top through which said retaining pin means passes and whose length corresponds to an energy recovery travel, and which system further includes:

a holding rod with an electric actuator, said holding rod constituting said anchor pin means at the end of said mobile support member, a retaining pin means on said fixed support member, and three windings mounted on a roller around said retaining pin means, each winding having a rectilinear portion extending in a plane generally parallel with said steering column axis, and a free end curved around said holding rod.

4. The system for modulatable absorption of energy claimed in claim 3, wherein said anchor pin means comprises said holding rod and its electric actuator mounted on and fixed to said outer bearing face of said mobile support member, said holding rod passes through a hole in each lateral portion of said mobile support member and is supported by two bearings forming part of a stirrup mounted on and fixed to said connecting portion of the end of said mobile support member, and a closure member of said stirrup surrounds the end of said mobile support member, said stirrup and the free ends of said windings, said closure member being assembled to said mobile support member and said stirrup.

5. The system for modulatable absorption of energy claimed in claim 3, wherein said retaining pin means comprises a rod with a sleeve between said two lateral portions of said mobile support member, said rod being sported at each end by a fixing assembly on the corresponding lug of said fixable member and by a sliding assembly of said mobile support member, and each fixing assembly being locked on each of said lugs against forces up to a particular value.

6. The system for modulatable absorption of energy claimed in claim 5, wherein said rod has one screwthreaded end and at the other end a head pressed onto the corresponding lug of said fixed support member.

7. The system for modulatable absorption of energy claimed in claim 5, wherein each fixing assembly comprises a clamping washer between said sleeve and the corresponding lug of said fixed support member and which has a tube passing through said oblong hole in the corresponding lateral portion of said mobile support member, and a corresponding screwthreaded end of said rod passes through said tube of said clamping washer and said hole in the corresponding lug to receive a clamping nut which is pressed onto said lug to lock said fixing assembly with a force having a predetermined value.

8. The system for modulatable absorption of energy claimed in claim 7, wherein each sliding assembly includes an outer washer with a square protuberance and an inner washer with a square hole which receives said square protuberance, said square protuberance has a hole through which said tube of said clamping washer passes, said outer washer is between the corresponding lug of said fixed support member and the corresponding lateral portion of said mobile support member, said inner washer is between said lateral portion and said clamping washer, and said square protuberance passes through and slides in the corresponding oblong hole of said mobile support member.

9. The system for modulating the absorption of energy claimed in claim 1, wherein said holding rod comprises said retaining pin means.

10. The system for modulatable absorption of energy claimed in claim 9, wherein said displacement means for each holding rod comprise an electric actuator which is activated by electric control means on a dashboard of said vehicle, said fixed support member includes a base with two substantially vertical lugs between which said mobile support member engages, each of said lugs having a hole in it through which said retaining pin means passes, said mobile support member has two lateral portions and a connecting portion, and each of said lateral portions has an oblong hole at the top through which said retaining pin means passes and whose length corresponds to an energy recovery travel, and which system further includes:

a holding rod and an electric actuator, said holding rod constituting said retaining pin means, which is in said fixed support member, said anchor pin means being arranged at the end of said mobile support member, and three windings each mounted on a roller around said holding rod, each winding having a rectilinear portion extending in substantially the same direction as a force to be damped, each rectilinear portion having a free end curved around said anchor pin means and said three rollers being mounted on a tube in which said holding rod slides.

11. The system for modulatable absorption of energy claimed in claim 10, wherein:

said retaining pin means comprises said holding rod and its electric actuator mounted on and fixed to said outside face of the corresponding lug of said fixed support member, said retaining pin means having at each end a fixing assembly on the corresponding lug of said fixed support member and a sliding assembly for the corresponding lateral portion of said mobile support member, each fixing assembly is locked on each of said lugs with a force having a predetermined value, and said holding rod passes through or engages in the corresponding fixing assembly.

12. The system for modulatable absorption of energy claimed in claim 11, wherein each fixing assembly comprises:

a metal tube which passes through said oblong hole of the corresponding lateral portion of said mobile support member and through said hole in the corresponding lug, an inner flare on the same side as said lateral portion and an outer flare on the same side as said lug for locking said fixing assembly, and a hole through which said holding rod passes.

13. The system for modulatable absorption of energy claimed in claim 12, wherein each sliding assembly includes:

an outer washer with a square half-protuberance and a hole through it, and an inner washer with a square half-protuberance and a hole through it, and wherein:

each half-protuberance nests in the other washer by means of tenons entering holes to form a square protuberance, said outer washer is between the corresponding lug of said fixed support member and the corresponding lateral portion of the mobile support member, said inner washer is between said lateral portion and said inner flare of said metal tube, and said square protuberance passes through and slides in the corresponding oblong hole in said lateral portion of said mobile support member.

14. The system for modulatable absorption of energy claimed in claim 11, wherein said holding rod is supported by four bearings forming part of a stirrup mounted under and fixed to said fixed support member.

15. The system for modulatable absorption of energy claimed in claim 10, wherein said anchor pin means comprises three semi-circular notches in an edge of said connecting portion which is part of the end of said mobile support member, each notch receives said free end of the corresponding winding and said free end curves around the corresponding notch.

16. The system for modulatable absorption of energy claimed in claim 1, wherein said displacement means for each holding rod comprise an electric actuator which is activated by electric control means on a dashboard of said vehicle.

17. The system for modulatable absorption of energy claimed in claim 16, wherein said electric actuator is a gear motor.

18. The system for modulatable absorption of energy claimed in claim 16, wherein said electric actuator is an electromagnetic device with a movable plunger.

19. The system for modulatable absorption of energy claimed in claim 1 wherein the energy absorbed is adapted according to the conditions of the impact and information varying in time supplied by sensors of various relevant parameters, so that the electric actuator at all times selects a required number of windings and correspondingly controls the linear movement of the corresponding mobile holding rod.

* * * * *